(12) United States Patent
Zuritis (10) Patent No.: US 11,522,488 B2
(45) Date of Patent: Dec. 6, 2022

(54) VERTICAL COLUMN

(71) Applicant: SOLAR FOUNDATIONS USA, INC., New Castle, DE (US)

(72) Inventor: Michael Zuritis, Ballston Lake, NY (US)

(73) Assignee: SOLAR FOUNDATIONS USA, INC., New Castle, DE (US)

( * ) Notice: Subject to any disclaimer, the term of this patent is extended or adjusted under 35 U.S.C. 154(b) by 0 days.

(21) Appl. No.: 16/404,869

(22) Filed: May 7, 2019

(65) Prior Publication Data
US 2020/0358391 A1    Nov. 12, 2020

(51) Int. Cl.
*H02S 20/10* (2014.01)
*E04H 12/08* (2006.01)
*E04H 12/34* (2006.01)

(52) U.S. Cl.
CPC ............ *H02S 20/10* (2014.12); *E04H 12/08* (2013.01); *E04H 12/347* (2013.01)

(58) Field of Classification Search
CPC ... E04H 12/08; E04H 12/347; E04H 12/2223; H02S 20/10; E02D 5/56; E02D 7/22; F24S 25/12; F24S 25/617; Y02E 10/47; Y02E 10/50
See application file for complete search history.

(56) References Cited

U.S. PATENT DOCUMENTS

| | | | | |
|---|---|---|---|---|
| 2,441,109 A * | 5/1948 | Carlson | ............... | E04H 12/2223 403/86 |
| 3,011,597 A * | 12/1961 | Galloway | ........... | E04H 12/2223 52/154 |
| 3,011,598 A * | 12/1961 | Galloway | ........... | E04H 12/2223 52/153 |
| 4,061,197 A * | 12/1977 | Skidmore, Jr. | ........... | E21B 4/14 175/101 |
| 4,803,812 A * | 2/1989 | Alexander, Sr. | ........ | E02D 5/801 52/157 |
| 4,832,304 A * | 5/1989 | Morgulis | ............... | A01K 97/10 135/16 |
| 5,396,916 A * | 3/1995 | Boissonnault | ......... | A45B 7/005 135/16 |
| 5,906,077 A * | 5/1999 | Andiarena | .......... | E04H 12/2223 135/118 |
| 6,032,880 A * | 3/2000 | Verrills | ............... | E04H 12/2223 248/156 |

(Continued)

FOREIGN PATENT DOCUMENTS

WO    2007036263 A1    4/2007
WO    2018111144 A1    6/2018

OTHER PUBLICATIONS

Extended European Search Report in corresponding European Patent Application No. 20173239.3 dated Sep. 29, 2020. 7 pages.

*Primary Examiner* — James M Ference
(74) *Attorney, Agent, or Firm* — Schmeiser, Olsen & Watts, LLP (57) ABSTRACT

A vertical column has a column body extending between a first end and a second end. The column body includes a main body, a conical portion extending from the main body, and a tip portion extending from the conical portion. The vertical column includes a first helical structure extending around a portion of the main body and a second helical structure extending around a portion the tip portion.

28 Claims, 4 Drawing Sheets

(56) References Cited

U.S. PATENT DOCUMENTS

| | | | |
|---|---|---|---|
| 6,412,235 B1* | 7/2002 | Pylant | E02D 5/801 |
| | | | 175/323 |
| 6,494,643 B1* | 12/2002 | Thurner | E04H 12/2223 |
| | | | 248/156 |
| 6,702,239 B2* | 3/2004 | Boucher | A01G 9/122 |
| | | | 248/125.8 |
| 6,722,821 B1* | 4/2004 | Perko | E02D 5/801 |
| | | | 405/249 |
| 6,814,525 B1* | 11/2004 | Whitsett | E02D 5/38 |
| | | | 405/233 |
| 7,007,910 B1* | 3/2006 | Krinner | E04H 12/2215 |
| | | | 248/156 |
| 7,314,335 B2* | 1/2008 | Whitsett | E02D 5/38 |
| | | | 405/233 |
| 7,338,232 B2* | 3/2008 | Nasr | E02D 5/46 |
| | | | 405/233 |
| 7,494,299 B1 | 2/2009 | Whitsett | |
| 7,635,240 B2* | 12/2009 | Gantt, Jr. | E02D 5/801 |
| | | | 405/252.1 |
| 7,731,454 B1 | 6/2010 | Watson, III et al. | |
| 7,854,451 B2* | 12/2010 | Davis, II | E21B 17/046 |
| | | | 285/404 |
| 8,407,949 B2* | 4/2013 | Kellner | E04H 12/2223 |
| | | | 52/157 |
| 9,068,409 B2* | 6/2015 | Mohamed | E21B 11/005 |
| 10,190,280 B2* | 1/2019 | Fallon | E02D 5/72 |
| 2001/0009204 A1* | 7/2001 | Stansfield | E02D 7/20 |
| | | | 175/23 |
| 2003/0159839 A1* | 8/2003 | Perko | E02D 5/56 |
| | | | 172/100 |
| 2004/0076479 A1* | 4/2004 | Camilleri | E02D 5/56 |
| | | | 405/252.1 |
| 2004/0103599 A1* | 6/2004 | Keck | E02D 5/801 |
| | | | 52/155 |
| 2004/0173385 A1* | 9/2004 | Carta | E04H 12/2223 |
| | | | 175/394 |
| 2006/0086884 A1* | 4/2006 | Santos | E04H 12/2223 |
| | | | 248/530 |
| 2008/0083172 A1* | 4/2008 | Tropiano | E02D 5/80 |
| | | | 52/157 |
| 2008/0157521 A1 | 7/2008 | Davis | |
| 2008/0164451 A1* | 7/2008 | Liefke | E04H 17/1443 |
| | | | 256/59 |
| 2008/0217599 A1* | 9/2008 | Scruggs | E04H 12/2223 |
| | | | 256/65.14 |
| 2010/0054864 A1* | 3/2010 | Stroyer | E02D 5/52 |
| | | | 405/233 |
| 2010/0319272 A1* | 12/2010 | Kellner | F24S 25/617 |
| | | | 52/157 |
| 2011/0067749 A1* | 3/2011 | Zuritis | H02S 20/10 |
| | | | 136/246 |
| 2011/0229272 A1* | 9/2011 | Lindsay | E02D 5/56 |
| | | | 405/253 |
| 2012/0073219 A1* | 3/2012 | Zuritis | F24S 25/61 |
| | | | 52/173.3 |
| 2012/0073563 A1* | 3/2012 | Zuritis | F24S 25/65 |
| | | | 126/569 |
| 2012/0087740 A1* | 4/2012 | Stroyer | E02D 5/56 |
| | | | 405/241 |
| 2012/0090665 A1* | 4/2012 | Zuritis | F16B 7/105 |
| | | | 136/251 |
| 2012/0117893 A1* | 5/2012 | Thurner | E01F 9/685 |
| | | | 52/157 |
| 2014/0190093 A1* | 7/2014 | Bushore | E04H 12/20 |
| | | | 52/169.13 |
| 2015/0132068 A1* | 5/2015 | Meline | E21D 20/028 |
| | | | 405/259.5 |
| 2015/0233075 A1* | 8/2015 | Maggio | E02D 7/22 |
| | | | 405/232 |
| 2016/0186403 A1* | 6/2016 | Tomchesson | E02D 5/526 |
| | | | 405/244 |
| 2017/0138080 A1* | 5/2017 | Cote | F16M 11/22 |
| 2017/0241154 A1* | 8/2017 | Faries | E04H 12/223 |
| 2017/0247899 A1* | 8/2017 | Faries | E04H 12/223 |
| 2017/0292289 A1* | 10/2017 | Hoye | E04H 17/26 |
| 2018/0030681 A1* | 2/2018 | Stroyer | E02D 5/801 |
| 2018/0258602 A1* | 9/2018 | Kemp | E02D 7/22 |

* cited by examiner

VERTICAL COLUMN

FIELD OF TECHNOLOGY

The subject matter disclosed herein relates generally to vertical columns. More particularly, the subject matter relates to vertical columns usable for solar array support structures, and methods of installation and manufacture thereof.

BACKGROUND

Renewable energy sources are becoming more popular with the rising cost of oil and other non-renewable energy resources. Solar energy is one of the renewable energy sources and has proven desirable to harness. One method of harnessing solar energy is to install a ground-mount structural array of solar panels, or a solar array, such that the solar panels each face the sun to achieve sunlight absorption. Many solar arrays include a combination of columns that extend from the ground, horizontal rails that extend between the columns, and mounting rails or bars that are attachable above the horizontal rails. Solar panels are then attached to the mounting rails with clamps or other fastening methods, such as direct bolting.

With ground-mount solar arrays, vertical piles or columns, for example, ground screws, are often installed into the ground as supports for various structures including but not limited to solar arrays. These vertical columns may need to be installed at precise locations in the ground in order to properly construct the solar array foundations. These vertical columns are typically installed with machinery which drives the vertical columns into the ground. Depending on the location of installation of a solar array structure, the vertical columns may need to be installed where the ground has hard soil, rock, or other qualities that make inserting the vertical columns difficult. These hard materials may need to be broken through or into by vertical columns in order to secure the vertical columns in the ground.

Thus, an improved vertical column that is usable for, for example, solar array support structures, and methods of installation and manufacture thereof, would be well received in the art.

SUMMARY

A first aspect relates to a vertical column comprising a column body extending between a first end and a second end and including a main body, a conical portion extending from the main body, and a tip portion extending from the conical portion, a first helical structure extending around at least a portion of the main body, and a second helical structure extending around at least a portion of the tip portion.

A second aspect relates to a method of making a vertical column comprising providing a vertical column comprising a column body extending between a first end and a second end and including a main body, a conical portion extending from the main body, and a tip portion extending from the conical portion, forming a first helical structure around at least a portion of the main body, and attaching a second helical structure around at least a portion of the tip portion.

A third aspect relates to a method of installing a vertical column for a solar array support structure comprising providing a vertical column comprising a column body extending between a first end and a second end and including a main body, a conical portion extending from the main body, and a tip portion extending from the conical portion, and rotating the pile such that the vertical column is inserted into the ground.

A fourth aspect relates to a method of installing a solar array support structure comprising providing at least one vertical column comprising a column body extending between a first end and a second end and including a main body, a conical portion extending from the main body, and a tip portion extending from the conical portion; and securing a solar array support structure on the at least one vertical column.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
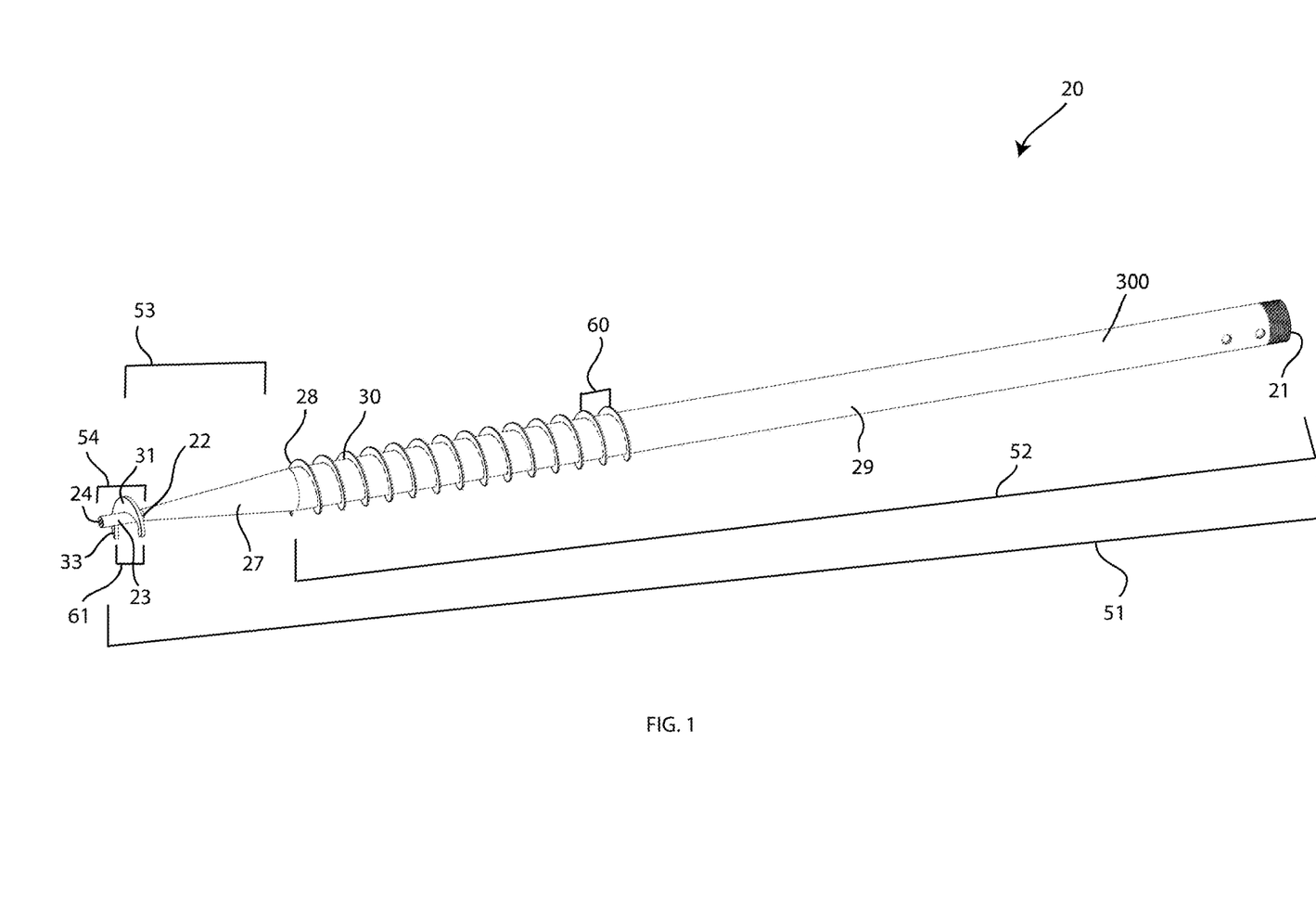
FIG. 1 depicts a perspective view of a vertical column, in accordance with one embodiment.

With reference to FIG. 1, a perspective view of a vertical column 20 is shown in accordance with one embodiment. The vertical column 20 may be a pile, stanchion, post, beam, shaft, stud, bar, rail, pole, pipe, tube, or the like, in any configuration that would be apparent to those skilled in the art. In the embodiment shown, the vertical column 20 has a column body 300 first length 51 that extends from a first end 21 to a second end 24. For solar support structure applications, the first length 51 may be 70 inches, 84 inches, 126 inches, or other lengths that are desired to achieve the support required. For the purposes of solar support structure applications, the vertical column 20 may be configured to be screwed into the ground at least 60-66 inches. The vertical column 20 has a main body 29 having a second length 52 extending from the first end 21 to a first transition location 28 along the first length 51. The second length 52 may be a substantial portion of the entirety of the first length 51. For example, the second length may be 80-90 percent of the first length. As another example, the second length 52 may be two thirds the first length 51. Thus, the vertical column 20 may be particularly adapted for residential or commercial ground mount solar support structure applications, or applications having similar load requirements to residential or commercial ground mount solar support structure applications.

A portion of the first length 51 of the vertical column 20 is shown including threads located at the first end 21. These threads may be configured to allow for extension of the vertical column 20 after installation into the ground. The extension of the vertical column 20 may be provided by an extender column having internal threads rotated about the first end 21. The threads at the first end 21 may provide for extending the height of the vertical column 20 in an efficient manner after the vertical column 20 has been installed into the ground. The threads at the first end 21 are not required, and the vertical column 21 may not require an extension after installation in other embodiments. For example, the front vertical columns of a solar array (shown in FIG. 4) may not require an extension, but the back columns may require an extension.

The vertical column 20 also has a conical portion 27 having a third length 53 extending from the first transition location 28 to a second transition location 22 along the first length. The third length 53 may be, for example, greater than six inches. The third length 53 may be, for example, 11.5 inches, or may be a foot or greater in length. In other embodiments, the third length 53 may be greater than three inches.

The vertical column 20 has a tip portion 23 extending from the conical section. The tip portion 23 has a fourth length 54 extending from the second transition location 22 to the second end 24. The fourth length 54 may be three inches. The fourth length 54 may be more or less than three inches. For example, the fourth length may be three inches to nine inches. The second end 24 may also be referred to as the tip, toe or pile toe. The first end 21 may also be referred to as the head, or pile head.

A first helical structure 30 extends around at least a portion of the main body 29. In the embodiment shown, the first helical structure 30 is a continuous helical coil that extends around a portion of the main body 29. In the embodiment shown, the first helical structure 30 extends from the first transition location 28. In another embodiment, the first helical structure 30 may extend from another location along the main body 29. In yet another embodiment, the first helical structure may extend around the entirety of the main body 29. Still further, the first helical structure 30 may extend from the main body 29 past the first transition location 28 and be located around at least a portion of, or the entire, conical portion 27.

A second helical structure 31 extends around a portion of the tip portion 23. In the embodiment shown, the second helical structure 31 extends towards the second end 24 from the second transition location 22. In another embodiment, the second helical structure 31 may extend from the second end 24 towards the second transition location 22. In yet another embodiment, the second helical structure 31 may extend along the entirety of the tip portion 23. Still further, the second helical structure 31 may extend along the entirety of the tip portion 23 and into at least a portion of the conical portion 27. In the embodiment shown, the second helical structure 31 is a single helicoid flight section. In another embodiment, the second helical structure may have two or more helical flight sections, or may be a continuous helical coil. The vertical column 20 may be manufactured from aluminum, steel, stainless steel, carbon steel, or other like materials that are robust enough to support a solar array support structure 10 (hereinafter described in FIG. 4).

Figure 2:
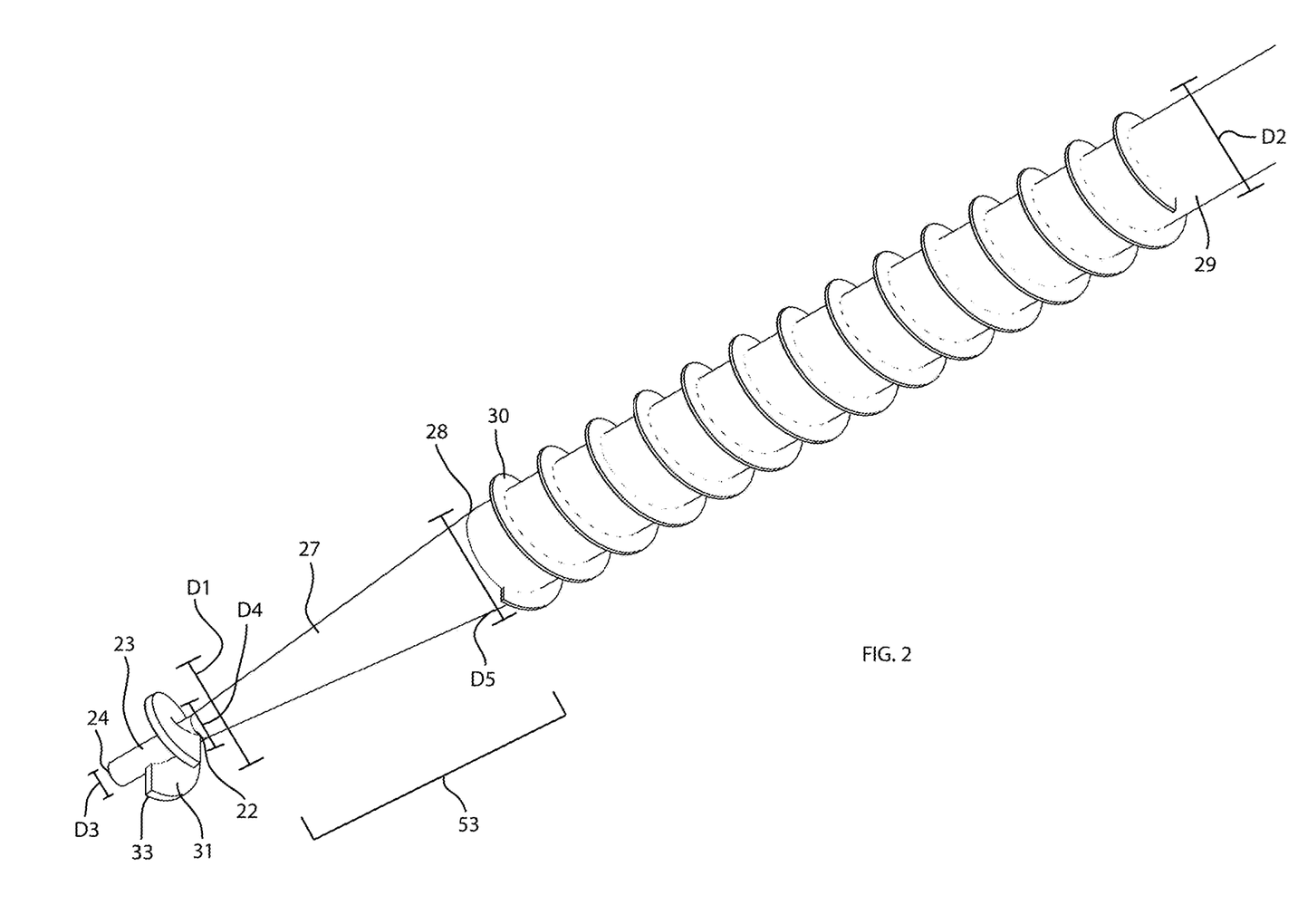
FIG. 2 depicts an enlarged view of a tip portion of the vertical column of FIG. 1, in accordance with one embodiment.

With reference to FIG. 2, an enlarged view of a tip portion of the vertical column 20 of FIG. 1 is shown in accordance with one embodiment. The tip portion 23 has a diameter D3 that is uniform extending from the second end 24 to the second transition location 22. In the embodiment shown, the diameter D3 of the tip section 23 is less than a diameter D2 of the main body 29. In another embodiment, the tip portion 23 may not have a uniform diameter from the second end 24 to the second transition location 22. For example, the tip portion 23 may be tapered. The tip portion 23 may be tapered such that tip portion 23 at the second location 22 has a diameter that is equal to the diameter of the second transition location 22, and such that the tip portion 23 tapers from the second transition location 22 to the second end 24. The second end 24 may be pointed. For example, the second end 24 may have a conical shape. As another example, the second end 24 may be blunt. In another embodiment, the tip portion 23 may be tapered or have a conical shape. For example, the vertical column 20 may have a continuous taper from the first transition location 28 to the second end 24 such that the tip portion 23 is a sub-portion of the conical portion 27.

The second helical structure 31 is located proximate to the second end 24. The second helical structure 31 may be formed from a single circular plate, and may be an individual turn or wrap that is formed into a helix. A front edge 33 of the second helical structure 31 closest to the second end 24 may be three-quarters of an inch from the second end 24. As another example, the front edge 33 of the second helical structure 31 closest to the second end 24 may be an inch from the tip. The front edge 33 of the second helical structure 31 closest to the second end 24 may be more or less than three quarters of an inch to an inch from the second end 24. For example, the front edge 33 may be a half inch to six inches from the second end 24. The front edge 33 may be blunt, or may have an angled cutting edge, similar to the edge of a knife. The front edge 33 may be perpendicular to the axis of the tip portion 23, or may be angled relative to the axis of the tip portion 23. The second helical structure 31 may be a thicker flight relative to the material utilized for the first helical structure 30, as the second helical structure 31 is the leading tip of the insertion of the vertical column 20 into the ground during installation thereof. For example, the second helical structure 31 may be ¼ inches thick, while the first helical structure may be ⅛ inches thick.

The location of the second helical structure 31 proximate to the tip 24 facilitates the insertion and installation of the vertical column 20 into the ground by facilitating insertion into and through the ground and hard materials in the ground such as hard soil, stones, and rocks. The second helical structure 31 has a diameter D1. The diameter D1 of the second helical structure 31 may be equal to the diameter D2 of the main body 29 such that a hole in the ground 200 made by the insertion of the tip portion 23 into the ground is made wide enough by the second helical structure 31 to more easily receive the main body 29 of the vertical column 20. The diameter D1 of the second helical structure 31 is not limited to being equal to the diameter D2 of the main body 29, and could be less or greater than the diameter D2 of the main body 29.

In the embodiment shown, the conical portion 27 does not have a helical structure such as the second helical structure 31 or first helical structure 30, extending around the conical portion 27. The conical portion 27 is tapered such that a first diameter D4 of the conical portion 27 that abuts the second transition location 22 is less than a second diameter D5 of the conical portion 27 abutting the first transition location 28. As shown in FIG. 2, the first diameter D4 of the conical portion 27 abutting the second transition location 22 is equal to the diameter D3 of the tip portion 23. Extending towards the first transition location 28, the conical portion 27 increases in diameter such that the diameter of the conical portion 27 at the first transition location 28 is equal to the diameter D2 of the main body 29. The conical portion 27 is not limited to being tapered. As another example, the conical portion 27 may have a uniform diameter that is less than the diameter D2 of the main body 29, and the first transition location 28 may be positioned in the center of a circumference of the main body 29.

The first helical structure 30 may be formed from a single piece of material, for example, a steel ribbon such as a hardened steel ribbon that is wrapped around the main body 29. The first helical structure 30 may be formed from a hardened steel ribbon that is formed into a helical coil before being attached around the main body 29. The first helical structure 30 has a pitch 60. The pitch is the height of one complete helix turn measured parallel to the axis of the helix. The pitch 60 of the first helical structure 30 may be equal to a pitch 61 of the second helical structure 31. For example, the pitch 60 of the first helical structure 30 and the pitch 61 of the second helical structure 31 may be a half an inch. As another example, the pitch 60 of the first helical structure 30 and the pitch 61 second helical structure 31 may be an inch. In still another exemplary embodiment, the pitches 60, 61 may each be 1.75 inches. As yet another example, the pitch 60 of the first helical structure 30 and the pitch 61 of the second helical structure 31 may be between one inch and three inches. The first helical structure 30 may have a different pitch than the second helical structure 31. For example, the pitch 60 may be less than the pitch 61. For example, the pitch 60 may be half the pitch 61. As another example, the pitch 60 may be 0.75 inches while the pitch 61 may be 1.75 inches. As yet another example, the pitch 60 may be a quarter of the pitch 61. A thickness of the piece of the material from which the first helical structure 30 is made may be equal to a thickness of the circular plate or piece of the material from which the second helical structure 31 is formed.

A method of making a vertical column such as vertical column 20, for a solar support structure may include providing a vertical column comprising a column body extending between a first end, such as first end 21, and a second end, such as second end 24, and including a main body, such as main body 29, a conical portion, such as conical portion 27 extending from the main body, and a tip portion, such as tip portion 23 extending from the conical portion. The method may further include forming a first helical structure, such as continuous helical coil 30, around a portion of the main body, and attaching a second helical structure, such as second helical structure 31 around at least a portion of the tip portion. In one embodiment, the forming a first helical structure around a portion of the main body comprises welding at least one ribbon of material around at least a portion of the main body. The ribbon of the continuous helical coil 30 may be formed around the main body and welded simultaneous to forming the helical structure. Alternatively, the continuous helical coil 30 may be formed into the helical structure prior to welding, the vertical column 20 inserted therein, and the continuous helical coil welded thereto.

In a further embodiment of the method, the forming a first helical structure around at least a portion of the main body and attaching a second helical structure around at least a portion of the tip portion are performed such that a first pitch of the first helical structure is equal to a second pitch of the second helical structure. Alternatively, the method may include forming the first pitch of the first helical pile to be different than the second pitch of the second helical pile. In another embodiment, the method may include providing a circular plate, cutting the circular plate from a location on the outer edge of circular plate to a hole in the center of the circular plate, and bending the cut circular plate into a single helical flight. In another embodiment, the circular plate may be bent into the second helical structure on the tip portion, and welded to the tip portion as the circular plate is being bent into the second helical structure. The method may further include providing a ribbon of material, forming the ribbon of material into the first helical structure, and then attaching the first helical structure to the main body, for example, by welding.

Figure 3:
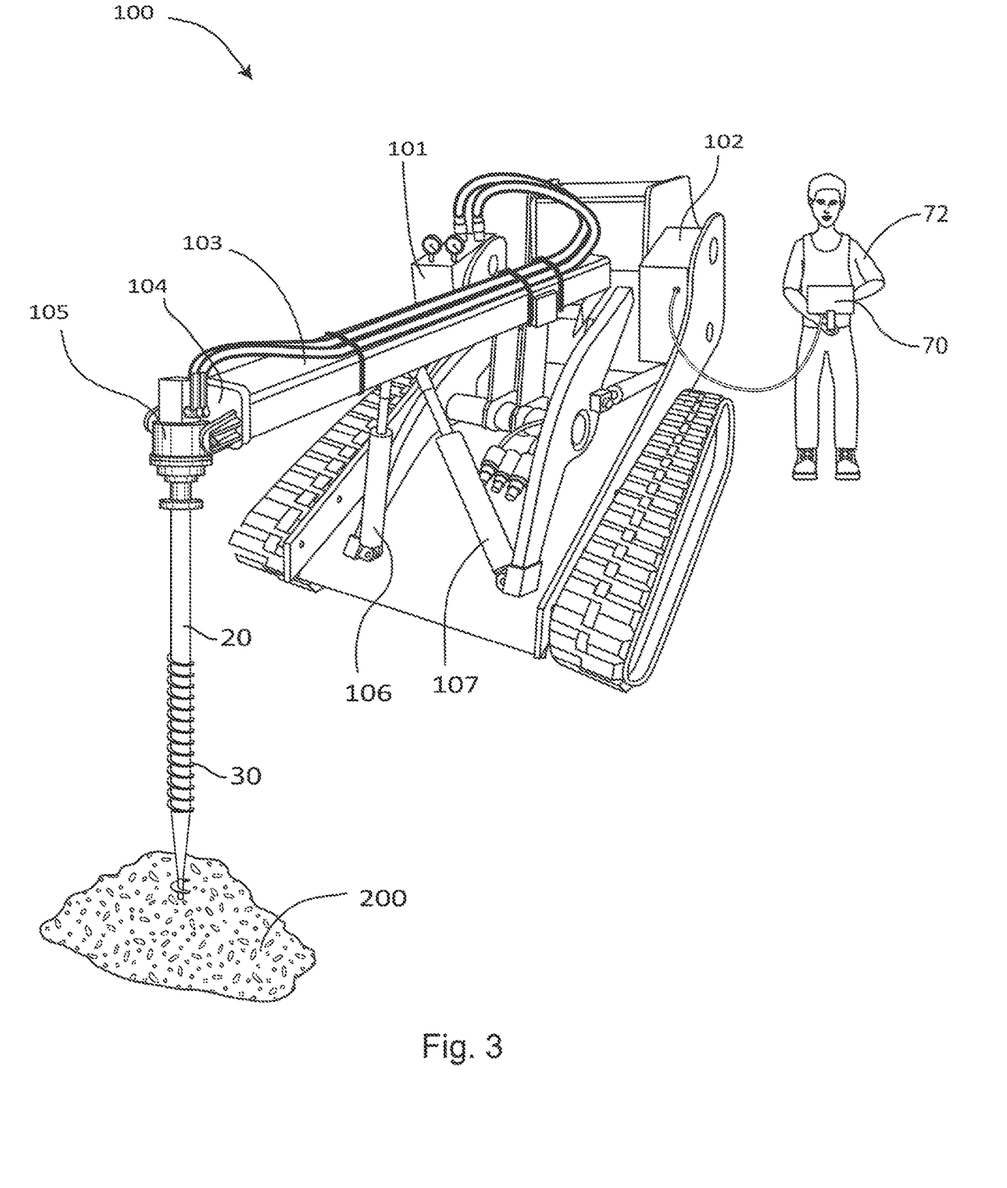
FIG. 3 depicts a perspective view of a worker using a machine to drive one of the vertical columns of FIGS. 1 and 2 into the ground, in accordance with one embodiment.

With reference to FIG. 3, a perspective view of a worker using a machine to drive one of the vertical columns of FIGS. 1 and 2 into the ground is shown, in accordance with one embodiment. A vertical loader vehicle 100 is shown being used to install vertical column 20 into the ground 200. The vertical loader vehicle 100 has a hydraulic system 101 and an electronic system 102 that is in communication with a remote controlling mechanism 70 being operated by an operator 72. The vertical loader vehicle 100 has a boom arm 103 with a rotating mechanism 105. The rotating mechanism 105 is attached to the boom arm 103 by a motor yoke 104 that is rotatable in multiple axes. The vertical loader vehicle 100 has a first boom arm hydraulic cylinder 106 and a second boom arm hydraulic cylinder 107 which may facilitate rotation of the boom arm 103. The rotating mechanism 105 is configured to attachably and detatchably receive the vertical column 20 as shown in FIG. 3, and is configured to rotate the vertical column 20. Other vehicles or equipment may also be used to install vertical column 20. For example, equipment having an attachment configured to rotate a vertical column 20 may be used.

The method of installing the vertical column may include providing a vertical column comprising a column body extending between a first end, such as first end 21, and a second end, such as second end 24, and including a main body, such as main body 29, a conical portion, such as conical portion 27 extending from the main body, and a tip portion, such as tip portion 23 extending from the conical portion. The method may further include rotating the vertical column such that the vertical column is inserted into the ground. The method may also include applying a constant downward pressure on the vertical column during the rotating of the vertical column. In one embodiment, the method may include attaching the vertical column to a vertical loader such as vertical loader 100 and applying a constant downward pressure on the vertical column by the vertical loader during the rotating the pile. In other embodiments, the method may include providing a vertical loader vehicle or attachment for a vertical loader vehicle, attaching a vertical column to the end of a boom of the vertical loader vehicle, such as boom arm 103, and rotating the boom arm with hydraulic cylinders, such as hydraulic cylinders 106, 107.

Figure 4:
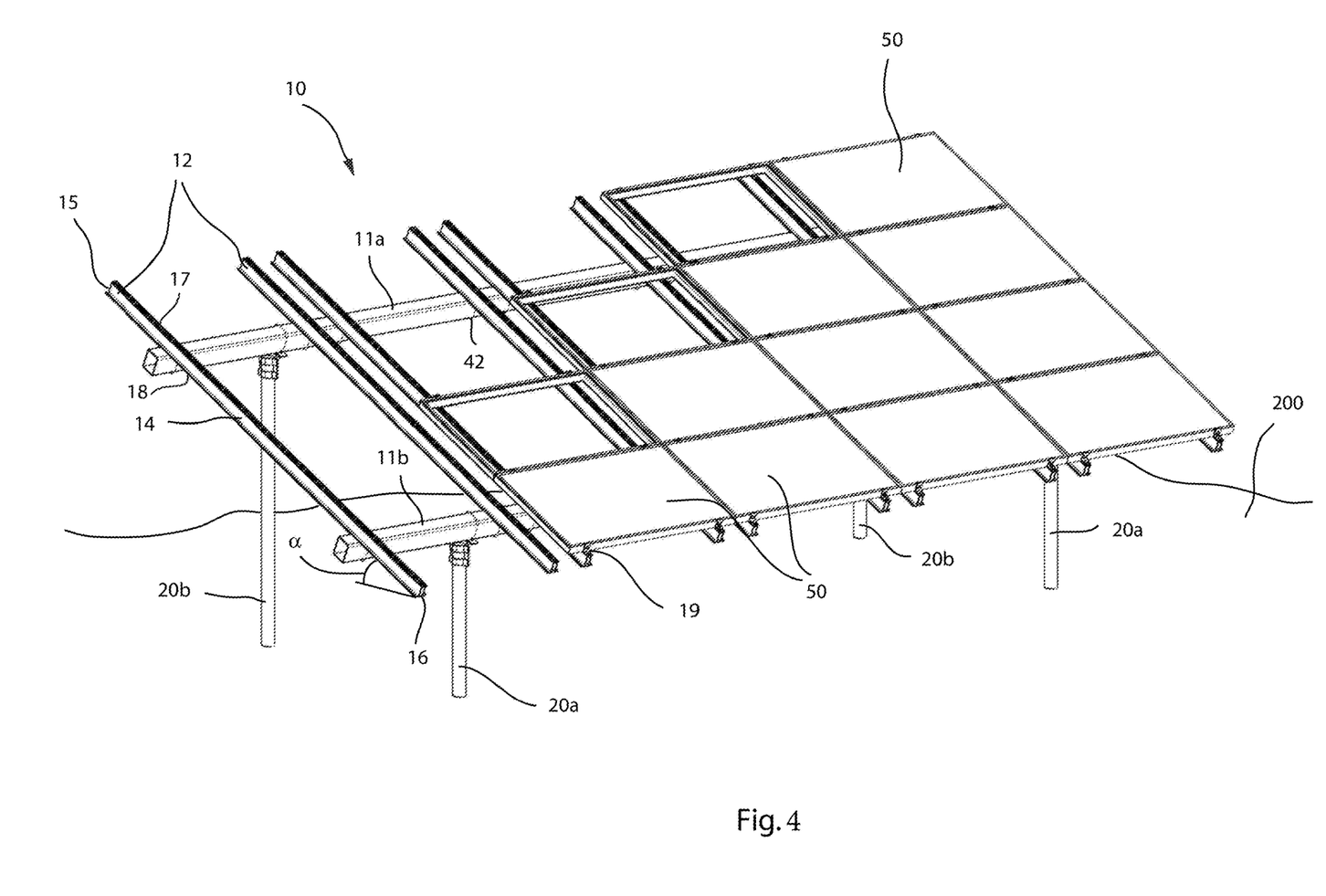
FIG. 4 depicts a perspective view of a solar array support structure that includes a plurality of the vertical columns of FIGS. 1 and 2, in accordance with one embodiment.

With reference to FIG. 4, a perspective view of a solar array support structure that includes a plurality of the vertical columns of FIGS. 1 and 2 is shown in accordance with one embodiment. A plurality of vertical columns 20 are shown installed in the ground 100 with a solar array support structure 10 secured thereon according to one embodiment. The solar array support structure 10 includes a plurality of supporting mounting rails 12 each include a main body having a top 17 and a bottom 18. The main body 14 extends from a first main body end 15 to a second main body end 16. The mounting rail 12 may have a dual web cross section that includes a first vertical element and a second vertical element. Furthermore, the mounting rail 12 may include a channel that extends along the top 17 that is configured to retainably receive an attachment mechanism 19 for attaching a solar panel 50 to the mounting rail 12. The mounting rail 12 may have a first flange and a second flange extending from the bottom of the first and second vertical elements respectively, each flange having a pair of openings configured to receive a two ends of a U-bolt. Thus, the mounting rail 12 may be securely attached directly to two horizontal rails 11a, 11b with the U-bolts. The various components of the solar array support structure 100 may be manufactured from aluminum, steel, stainless steel or other like materials that are robust enough to support the solar panels 50.

In the embodiment shown, a plurality of front vertical columns 20a extend substantially vertically from the ground to a bottom horizontal rail 11b, while a plurality of rear support columns 20b extend substantially vertically from the ground to a top horizontal rail 11a. The top and bottom horizontal rails 11a, 11b may be at respective heights such that when several of the mounting rails 12 are attached thereto, they extend above the ground at a predetermined angle α. The solar array support structure 10 is not limited to the embodiment shown in FIG. 4, and may have a different configuration. For example, the solar array support structure 10 may have more or less than four vertical columns 20. As another example, the solar array support structure 100 may be automatically adjustable in tilt and height with telescopic rails and columns. Many other embodiments would be apparent to those skilled in the art. Whatever the construction of the solar array support structure 10, the vertical columns 20 and horizontal rails 11 are configured to hold the mounting rails 12 above the ground when the solar array support structure 10 is installed.

A method of installing a solar array support structure may include providing at least one vertical column, such as vertical column 20, wherein the at least one vertical column comprising a column body extending between a first end, such as first end 21, and a second end, such as second end 24, and including a main body, such as main body 29, a conical portion, such as conical portion 27 extending from the main body, and a tip portion, such as tip portion 23 extending from the conical portion, and securing a solar array structure, such as solar array structure 10, on the at least one vertical column.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A vertical column comprising:
   a column body having a first end and a second end such that the column body extends between the first end and the second end, the column body including a main body having a continuous diameter, the column body further including a conical portion extending from the main body, wherein the conical portion extends between a greater diameter end and a lesser diameter end, wherein the greater diameter end includes a matching diameter to the continuous diameter of the main body, the conical body further including a tip portion extending from the lesser diameter end of the conical portion, wherein the tip portion includes a matching diameter to the lesser diameter end of the conical portion, wherein the conical portion does not have a helical structure;
   a first helical structure extending around at least a portion of the main body, wherein the first helical structure is a continuous helical coil that includes a plurality of flights having a continuous outer diameter; and
   a second helical structure extending around at least a portion of the tip portion,
   wherein the vertical column is configured to at least partially extend from the ground after installation and support at least one horizontal rail of a ground mount solar array support structure.

2. The vertical column of claim 1, wherein a diameter of a portion of the main body that does not include the first helical structure is larger than a diameter of the second helical structure.

3. The vertical column of claim 2, wherein a diameter of the second helical structure is equal to the diameter of the portion of the main body that does not include the first helical structure.

4. The vertical column of claim 1, wherein the tip portion extends a length having a uniform diameter along the length and wherein the second helical structure is located on the length having the uniform diameter.

5. The vertical column of claim 1, wherein the tip portion is tapered such that the vertical column has a continuous taper from the conical portion to the second end.

6. The vertical column of claim 1, wherein the conical portion has a length that is greater than a length of the tip portion.

7. The vertical column of claim 1, wherein the second end is pointed.

8. The vertical column of claim 1, wherein the second end is blunt.

9. The vertical column of claim 1, wherein the tip portion has a first wing and a second wing extending from the tip portion on opposing sides of the tip portion.

10. The vertical column of claim 1, wherein a first pitch of the first helical structure is equal to a second pitch of the second helical structure.

11. The vertical column of claim 1, wherein the second helical structure is a single helical flight section.

12. The vertical column of claim 1, wherein the first helical structure extends from the second end.

13. The vertical column of claim 1, wherein the second helical structure includes an outer diameter that is larger than the continuous outer diameter of the first helical structure.

14. The vertical column of claim 1, wherein the column body is formed from a continuous length of pipe.

15. The vertical column of claim 1, wherein the tip portion includes a continuous outer diameter.

16. A method of making the vertical column of claim 1, comprising:
   forming the first helical structure around at least a portion of the main body; and
   attaching the second helical structure around the at least a portion of the tip portion.

17. The method of claim 16, wherein the forming the first helical structure around the at least the portion of the main body includes welding at least one ribbon of material around the at least a portion of the main body.

18. The method of claim 16, wherein the second helical structure is formed of a circular plate of material.

19. The method of claim 16, wherein the continuous diameter of the main body is larger than a second diameter of the tip portion.

20. The method of claim 16, wherein a third diameter of the second helical structure is at least equal to the continuous diameter of the main body.

21. The method of claim 16, wherein the tip portion has a uniform diameter.

22. The method of claim 16, wherein the forming the first helical structure around the at least the portion of the main body and attaching the second helical structure around at least a portion of the tip portion are performed such that a first pitch of the first helical structure is equal to a second pitch of the second helical structure.

23. The method of claim 16, wherein the first helical structure is a continuous helical coil.

24. The method of claim 16, wherein the second helical structure is a single helical flight section.

25. A method of installing a vertical column for a solar array support structure comprising:
providing the vertical column of claim 1; and
rotating the pile such that the vertical column is inserted into the ground.

26. The method of installing a vertical column for a solar array support structure of claim 25 further comprising:
applying a constant downward pressure on the vertical column during the rotating the vertical column.

27. The method of installing a vertical column for a solar array support structure of claim 25 further comprising:
attaching the vertical column to a vertical loader; and
applying a constant downward pressure on the vertical column, by the vertical loader, during the rotating the vertical column.

28. The method of installing a vertical column for a solar array support structure of claim 23, further comprising:
securing a solar array support structure on the vertical column.

* * * * *